United States Patent
Krickeberg et al.

(10) Patent No.: US 10,966,540 B2
(45) Date of Patent: Apr. 6, 2021

(54) REMOTE CONTROL FOR CONTROLLING A MEDICAL APPLIANCE

(71) Applicant: MAQUET GMBH, Rastatt (DE)

(72) Inventors: Thomas Krickeberg, Karlsbad (DE); Roland Hopp, Hamburg (DE); Tim Golde, Karlsruhe (DE); Fred Held, Hamburg (DE)

(73) Assignee: MAQUET GMBH, Rastatt (DE)

( * ) Notice: Subject to any disclaimer, the term of this patent is extended or adjusted under 35 U.S.C. 154(b) by 335 days.

(21) Appl. No.: 15/679,270

(22) Filed: Aug. 17, 2017

(65) Prior Publication Data

US 2018/0008052 A1 Jan. 11, 2018

Related U.S. Application Data

(63) Continuation-in-part of application No. PCT/EP2016/052327, filed on Feb. 4, 2016.

(30) Foreign Application Priority Data

Feb. 19, 2015 (DE) ...................... 10 2015 102 351.2

(51) Int. Cl.
*A47C 31/00* (2006.01)
*A61G 13/08* (2006.01)
(Continued)

(52) U.S. Cl.
CPC ............ *A47C 31/008* (2013.01); *A61G 7/018* (2013.01); *A61G 13/08* (2013.01); *A61G 15/10* (2013.01);
(Continued)

(58) Field of Classification Search
CPC ....... A47C 31/008; H04W 4/80; A61G 7/018; A61G 13/02; A61G 13/08; A61G 15/10; A61G 2203/12; G06F 3/0484
(Continued)

(56) References Cited

U.S. PATENT DOCUMENTS 6,133,847 A * 10/2000 Yang ................... G05B 19/0426
340/12.25
6,748,278 B1 * 6/2004 Maymudes ............ G05B 15/02
340/12.3
(Continued)

FOREIGN PATENT DOCUMENTS

CN 1550101 A 11/2004
CN 101040801 A 9/2007
(Continued)

OTHER PUBLICATIONS

Schmitz (Gynaecology, Urology and Proctology, The Perfect equipment to meet all requirements, Catalogue No. 75, Valid as of May 2010) (Year: 2010).*
(Continued)

*Primary Examiner* — Kenneth M Lo
*Assistant Examiner* — Michael W Choi (57) ABSTRACT

A remote-control device for controlling an appliance having a plurality of appliance components is provided. The remote-control device includes a plurality of pushbutton units, each pushbutton unit including at least one physical operating pushbutton configurable to control at least one appliance component. Each of the pushbutton units is provided with a visually detectable distinguishing feature for visually distinguishing one pushbutton unit from another pushbutton unit. The remote-control device also includes a display unit configured to display representations of each controllable appliance component. Each representation of an appliance component includes the same visually detectable distinguishing feature as a corresponding pushbutton unit to which the appliance component is assigned.

23 Claims, 7 Drawing Sheets

(51) Int. Cl.
| | | |
|---|---|---|
| *H04W 4/80* | (2018.01) | |
| *A61G 7/018* | (2006.01) | |
| *A61G 15/10* | (2006.01) | |
| *G06F 3/0484* | (2013.01) | |
| *A61G 13/02* | (2006.01) | |

(52) U.S. Cl.
 CPC ............ *G06F 3/0484* (2013.01); *H04W 4/80* (2018.02); *A61G 13/02* (2013.01); *A61G 2203/12* (2013.01); *G05B 2219/23051* (2013.01)

(58) Field of Classification Search
 USPC .......................................................... 700/66
 See application file for complete search history.

(56) References Cited

U.S. PATENT DOCUMENTS

| | | | |
|---|---|---|---|
| 7,089,612 | B2 | 8/2006 | Rocher et al. |
| 7,461,350 | B2 | 12/2008 | Salo et al. |
| 7,669,261 | B2 | 3/2010 | Früh et al. |
| 2006/0080777 | A1* | 4/2006 | Rocher ................. A61G 13/08 5/618 |
| 2007/0157385 | A1* | 7/2007 | Lemire ................. A61G 7/005 5/600 |
| 2007/0291006 | A1 | 12/2007 | Park et al. |
| 2010/0231421 | A1* | 9/2010 | Rawls-Meehan .... A47C 20/041 341/20 |
| 2012/0194436 | A1 | 8/2012 | Thodupunuri |

FOREIGN PATENT DOCUMENTS

| | | |
|---|---|---|
| CN | 101606111 A | 12/2009 |
| DE | 102013103755 A1 | 10/2014 |
| EP | 0523881 B1 | 5/1999 |
| FR | 2819173 A1 | 7/2002 |
| WO | 96/26615 A1 | 8/1996 |

OTHER PUBLICATIONS

Translation of International Search Report (completed May 10, 2016, dated May 18, 2016) which issued for corresponding international application PCT/EP2016/052327, 2 pages.

Notice of Opposition filed on May 21, 2019 by Karl Storz SE & Co. KG against corresponding EP patent application No. 16706544.0 (now EP patent No. 3258902), 20 pages.

Chinese Office Action and Chinese Search Report (with English translations) dated Mar. 29, 2019 during the prosecution of corresponding Chinese Patent Application No. 201680010286.9, 15 pages.

"The New Benchmark for Surgical Versatility: Steris 5085 and 5085 SRT Surgical Tables", Informational Brochure, Steris, Apr. 2009, 8 pages.

Diamond Surgical Table Brochure, Schmitz, Catalogue No. 84, listed date Aug. 2013, 36 pages.

Office Action dated Jun. 10, 2020, issued in a corresponding Korean Publication No. 10-2017-0118819, published Oct. 25, 2017.

Schmitz Catalog, "The range of Schmitz products for gynaecology, urology and proctology," Catalogue No. 75, Jan. 2015, 72 pages.

* cited by examiner

REMOTE CONTROL FOR CONTROLLING A MEDICAL APPLIANCE

CROSS-REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2016/052327, filed on Feb. 4, 2016, which designates the United States of America, and claims benefit of German Patent Application No. 10 2015 102 351.2, filed on Feb. 19, 2015. The disclosure of each of these applications is incorporated by reference herein in its entirety.

TECHNICAL FIELD

The present disclosure relates to a remote-control device for controlling an appliance, such as a medical appliance. For example, the disclosed remote-control device may be configured for controlling an operating table that includes one or more actuatable or controllable appliance or table components. The present disclosure also relates to a system having a remote-control device and an appliance, such as a medical appliance, which can be actuated or controlled by the remote-control device. The present disclosure further relates to a method for controlling an appliance, such as a medical appliance, using the disclosed remote-control device.

BACKGROUND

Medical appliances such as operating tables can be controlled using a remote-control device to, for example, adjust table components such as different table segments or a table column. Although remote-control devices with virtual operating pushbuttons are commonly used in the present technical field, for reasons explained below, remote-control devices having physical operating pushbuttons rather than virtual pushbuttons are frequently preferred by medical appliance operators. "Virtual" operating pushbuttons include computer-generated graphical user interfaces, such as a button displayed on a touch-sensitive screen, of which the shape, size, appearance, and positioning can be changed relatively easily. In contrast, "physical" operating pushbuttons include concrete, physical elements of which the size, shape, appearance and positioning are typically fixed or unchangeable.

A remote-control device with virtual operating pushbuttons has the advantage of being adaptable in a relatively easy way to match the configuration of the medical appliance to be controlled, such as, a particular model of an operating table that is currently used. Such an adaptation is difficult to achieve for a remote-control device having physical operating pushbuttons. However, physical operating pushbuttons have advantages such as, for example, their haptic perceptibility. For example, a user can feel the physical operating pushbuttons and locate them on the remote-control device by touch or feel. Moreover, when actuating a physical operating pushbutton, the user receives mechanical feedback, so that the user knows whether or not the pushbutton has been depressed. Finally, in a remote-control device with physical operating pushbuttons, it is simpler to implement methods for preventing erroneous inputs.

When there is a plurality of operating table types, each type being configured differently and potentially having more than one configuration, it becomes difficult to design a pushbutton layout for a remote-control device having physical operating pushbuttons such that all possible table configurations can be addressed to an intuitive operation. Therefore, in conventional technologies, different remote-control devices have been designed for different operating tables. For example, a specific pushbutton layout is designed for a specific operating table for the adjustable table components thereof. In such a pushbutton layout, different configurations of the same operating table can be controlled using appropriate configurations of background illumination of the pushbuttons. For example, when a specific pushbutton has a corresponding function in a configuration of the operating table to be controlled, the background illumination of that pushbutton is activated. When a specific pushbutton has no corresponding function in the configuration of the operating table to be controlled, the background illumination of that specific pushbutton is deactivated.

The present disclosure provides a remote-control device having physical operating pushbuttons that can be configured to control a plurality of different appliances, including medical appliances such as operating tables, in an intuitive manner.

BRIEF SUMMARY

In one exemplary aspect of the disclosure, a remote-control device for controlling an appliance having a plurality of appliance components is provided. The remote-control device includes a plurality of pushbutton units each including at least one physical operating pushbutton configurable to control at least one appliance component. Each of the pushbutton units is provided with a visually detectable distinguishing feature for visually distinguishing one pushbutton unit from another pushbutton unit. The remote-control device also includes a display unit configured to display representations of each controllable appliance component. Each representation has the same visually detectable distinguishing feature as a corresponding pushbutton unit to which the appliance component is assigned.

In another exemplary aspect of the disclosure, a system including an appliance including a plurality of appliance components is provided. The system also includes a remote-control device. The remote-control device includes a plurality of pushbutton units each including at least one physical operating pushbutton configurable to control at least one appliance component. Each of the pushbutton units is provided with a visually detectable distinguishing feature for visually distinguishing one pushbutton unit from another pushbutton unit. The remote-control device also includes a display unit configured to display representations of each controllable appliance component. Each representation has the same visually detectable distinguishing feature as a corresponding pushbutton unit to which the appliance component is assigned.

In yet another exemplary aspect of the disclosure, a method for controlling an appliance having a plurality of appliance components is provided. The method includes assigning control of a first appliance component to a first pushbutton unit on a remote-control device and control of a second appliance component to a second pushbutton unit on the remote-control device. Each of the first and second pushbutton units has a unique, visually detectable distinguishing feature. The method also includes displaying, on a display unit of the remote-control device, a representation of the first and second appliance components. Each representation has the same unique, visually detectable distinguishing feature as the corresponding pushbutton unit to which the corresponding appliance component s assigned.

Additional features and advantages of the present disclosure will be apparent from the following description, in which the features of the present disclosure are explained in reference to exemplary embodiments, in conjunction with the accompanying figures or may be learned by practice of the present disclosure.

It is to be understood that both the foregoing general description and the following detailed description are exemplary and explanatory only and are not restrictive of the present disclosure and claims.

A remote-control device according to the present disclosure includes a plurality of pushbutton units, each including at least one physical operating pushbutton, for actuating or controlling components of an appliance, such as a medical appliance. In some embodiments, each of the pushbutton units is provided with an individual visually detectable distinguishing feature for visually distinguishing one pushbutton from another. The remote-control device may include a display unit for displaying representations of the appliance including the appliance components. For example, the display unit may display pictograms representing the appliance components that can be actuated or controlled by the pushbutton units. In some embodiments, the display unit may also display pictograms representing the appliance components that are not actuated or controlled by the pushbutton units.

The remote-control device may also include a provisioning unit for obtaining assignment information that defines a unique association between the pushbutton units and the appliance components that can be actuated or controlled by the pushbutton units. The remote-control device may further include a control unit for assigning the pushbutton units to the appliance components based on the assignment information. In other words, the control unit associates the pushbutton units with the appliance components, such that a specific pushbutton unit controls a corresponding appliance component. According to the present disclosure, the control unit controls the display unit to display pictograms representing the actuatable appliance components with the same visually detectable distinguishing features of the pushbutton units that are assigned to the respective appliance components based on the assignment information.

In the following examples, the remote-control device is described as being configured to control operating tables with adjustable table components. The application of the remote-control device is not limited to controlling operating tables. The remote-control device of the present disclosure can also be used for controlling other medical appliances such as lamp systems. In addition, the remote-control device may be used for controlling appliances other than medical appliances, such as tables with controllable components or segments that may be used for personal, industrial, or recreational purposes.

In some embodiments, the pushbutton units arranged on the remote-control device, each including one or more physical operating pushbuttons, are provided with individual visually detectable distinguishing features. Based on the individual visually detectable distinguishing features, the user can distinguish different pushbutton units from one another. The distinguishing features are also included in a representation of the appliance displayed on a display unit of the remote-control device. On the display unit, for example, pictograms representing the appliance components that can be actuated or controlled by the respective pushbutton units are displayed with the same visually detectable distinguishing features of the corresponding pushbutton units assigned to the appliance components. The representation of the medical appliance on the display unit thus corresponds to the physical pushbutton units arranged on the remote-control device in a manner that allows the user to readily recognize which appliance components can be actuated or controlled by which pushbutton units. As a result, the operation of the remote-control device becomes simple.

The control unit included in the remote-control device is configured to associate the physical pushbutton units arranged on the remote-control device with the representations (e.g., pictograms) of the actuatable appliance components displayed on the display unit. In some embodiments, the control unit establishes the association based on assignment information that defines, for the operating table to be actuated at a given time, a unique association between the appliance components of the operating table and the pushbutton units. Although the remote-control device according to the present disclosure has a fixed, unchangeable pushbutton layout, the remote-control device can be adapted flexibly to different medical appliances. This adaptation is achieved by reproducing the unchangeable visually detectable distinguishing features of the physical pushbutton units on the display unit in a changeable association with the pictograms representing the appliance components that can be actuated. In this manner, the remote-control device of the present disclosure combines the advantages of physical operating pushbuttons, particularly the haptic perceptibility thereof, with the advantages of a graphic user interface which can be adapted flexibly to different appliance configurations.

In some embodiments, the physical pushbutton units have different colors as individual visually detectable distinguishing features. Using different colors provides a simple way to establish the correspondence between the physical pushbutton units and the pictograms displayed by the display unit, which represent the appliance components that can be actuated by the pushbutton units. The present disclosure is not limited to the use of different colors as distinguishing features. For example, the pushbutton units may be provided with distinguishable patterns, crosshatchings, shapes, etc., which can be reproduced (e.g., displayed) on the display unit in a variable association with the pictograms representing the appliance components.

In some embodiments, the remote-control device includes a communication module connected to the control unit. Upon actuation of the respective physical operating pushbutton, the control unit may send, through the communication module, a control command for actuating the associated appliance components to the medical appliance. In some embodiments, the communication module is configured to communicate wirelessly, for example, via radio signals or infrared signals, with the medical appliance.

In some embodiments, the provisioning unit of the remote-control device is configured to receive the assignment information from the medical appliance. The provisioning unit may be a part of the above-mentioned communication module, and the assignment information may be sent wirelessly or by a wired connection to the provisioning unit of the remote-control device.

In some embodiments, the provisioning unit includes at least one input pushbutton for receiving an input of the assignment information, which may be separate from the communication module. The input pushbutton may be a physical or a virtual pushbutton. For example, the input pushbutton may be a switching surface arranged on a touch-sensitive screen. As another example, the input pushbutton may be a button displayed on the touch-sensitive screen of the provisioning unit.

The assignment information enables the control unit to flexibly assign the physical pushbutton units arranged on the remote-control device to the actuatable appliance components of the medical appliance to be controlled. The assignment information may include a model number of the appliance model to be controlled. Based on the model number, the control unit may select, for example, from a plurality of data sets stored in the remote-control device and assigned to different appliance models, the data set associated with the medical appliance to be controlled. Based on the selected data set, the control unit may perform the desired assignment. This implementation of the assignment information is exemplary. In some embodiments, the assignment information sent from the medical appliance to the remote-control device already includes the appropriate data set, such that, in the remote-control device, no data sets relating to different appliance models need to be stored.

In some embodiments, the input pushbutton is a selection pushbutton, through which the pictogram with which respective visually detectable distinguishing feature is to be associated, can be selected from a subgroup of the pictograms represented on the display unit. Such a selection pushbutton is particularly advantageous when the number of actuatable appliance components exceeds the number of pushbutton units that can be assigned to the appliance components. In such a configuration, each pushbutton unit is configured to actuate, as desired, one of a plurality of appliance components. The pictograms representing the plurality of appliance components that can be assigned to a specific pushbutton unit form the above-mentioned subgroup. The desired appliance component to which the pushbutton unit is to be assigned can be selected, when an input is received at the selection pushbutton. For example, when an input is received at the selection pushbutton, the assignment of a pushbutton unit to a first appliance component is changed to an assignment of the pushbutton unit to a second appliance component. In accordance with the change of the assignment, on the display unit, the visually detectable distinguishing feature changes from one pictogram representing the first appliance component to another pictogram with the subgroup representing the second appliance component. The subgroup of pictograms (which represents a subgroup of appliance components) can include any suitable number, such as two, three, four, etc. In some embodiments, when the selection pushbutton is pressed, the selection of the pictograms (hence the corresponding appliance component) is switched among the pictograms included in the subgroup (hence the appliance component selected is switched among the appliance components in the subgroup). The subgroup may be defined by the control unit included in the remote-control device. In this manner, it is possible to remotely control medical appliances that include a relatively high number of adjustable appliance components by a relatively small number of physical operating pushbuttons.

The selection pushbutton may be a physical pushbutton or a virtual pushbutton. For example, in some embodiments, the selection pushbutton is a switching surface arranged on a touch-sensitive screen forming the display unit. As another example, the selection pushbutton may be a button displayed on the touch-sensitive screen of the display unit.

In some embodiments, the respective pushbutton unit includes visual indicators for indicating pushbutton functions. The visual indicators may be independent of the respective visually detectable distinguishing features. The visual indicators for indicating the pushbutton functions may include arrow symbols located on the operating pushbuttons. In some embodiments, the visual indicators may be represented by shapes of the respective operating pushbuttons or the arrangements of the operating pushbuttons with respect to one another.

In some embodiments, the pictograms representing the actuatable appliance components are displayed on the display unit such that they are oriented toward the associated pushbutton units. For example, a vertical orientation of the pictograms displayed on the display unit toward the pushbutton units may simplify the operation of the remote-control device.

In some embodiments, the control unit controls the display unit to display pictograms to represent non-actuatable appliance components. The pictograms representing non-actuatable appliance components are distinguishable from the pictograms representing the actuatable appliance components that can be actuated by the pushbutton units. For example, the actuatable appliance components may be represented by pictograms displayed on the display unit with solid lines, while non-actuatable appliance components may be represented by pictograms displayed with dashed lines. In this manner, a user of the remote-control device can determine which of the appliance components are actuatable and which are not actuatable.

In accordance with another aspect of the present disclosure, a system includes a remote-control device and at least one medical appliance that can be controlled by the remote-control device. The at least one medical appliance may include a plurality of actuatable appliance components.

The present disclosure also provides a method for controlling at least one medical appliance provided with a plurality of actuatable appliance components using a remote-control device as disclosed herein.

Figure 1:
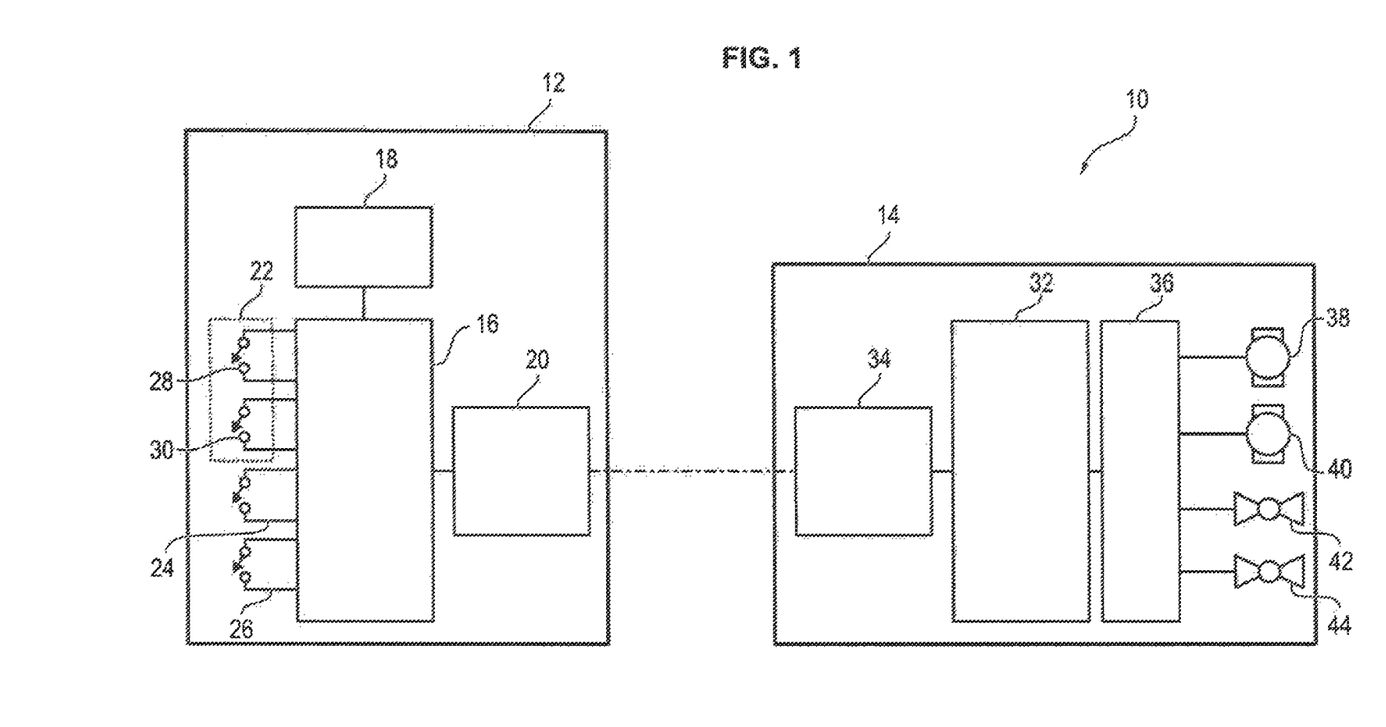
FIG. 1 is a block diagram showing a system according to the present disclosure, which includes a remote-control device and at least one operating table.

Turning now to the drawings, in FIG. 1, a system 10 according to the present disclosure is shown diagrammatically and may include an operation table system. The system 10 includes a remote-control device 12 and an operating table 14 that can be controlled by the remote-control device 12. A user may operate the remote-control device 12 to control the operating table 14.

As shown in FIG. 1, the remote-control device includes a control unit 16 configured to control different functional units of the remote-control device 12. The control unit 16 may include any suitable processors with hardware and software components to perform various control processes of the remote-control device 12. The remote-control device 12 also includes a display unit 18 that includes a screen and a communication module 20. The control unit 16 is coupled to the display unit 18 and the communication module 20. The remote-control device 12 also includes a plurality of pushbutton units 22, 24, and 26. The control unit 16 is also connected to the pushbutton units 22, 24, and 26. The pushbutton unit 22 includes two physical operating pushbuttons 28 and 30. The pushbutton unit 22 may include any other suitable number of physical operating pushbuttons, such as one, three, four, five, six, etc. In the embodiment shown in FIG. 1, the pushbutton units 24 and 26 are each formed by a single physical operating pushbutton. In some embodiments, each of the pushbutton units 24 and 26 may be formed by any other suitable number of physical operating pushbuttons, such as two, three, four, five, six, etc. When the user actuates the pushbutton units 22, 24, and 26, e.g., by pressing the pushbutton units by hand, the user can control the operating table 14.

The operating table 14 includes a control unit 32 connected to a communication module 34 and to a driver unit 36. The driver unit 36 is coupled to different actuatable functional units 38, 40, 42, and 44. The functional units 38 and 40 include one or more actuators that actuate adjustable table segments (not shown in FIG. 1) of the operating table 14, while the functional units 42 and 44 denote other types of table components, for example, lamps.

The remote-control device 12 and the operating table 14 are coupled to one another by a wired or wireless connection through communication modules 20 and 34. In the case of a wireless coupling, the communication modules 20 and 34 communicate with one another through wireless communication signals, such as WiFi, Bluetooth, infrared signals, or radio signals. In order to control the functional units 38, 40, 42, and 44 provided on the operating table 14 via the remote-control device 12, the user actuates one of the pushbutton units 22, 24, and 26 provided on the remote-control device 12. When one of the pushbutton units 22, 24, and 26 is actuated, the control unit 16 receives an actuation signal and converts the actuation signal into a control signal. The control unit 16 sends the control signal to the communication module 20. The communication module 20 then sends the control signal to the communication module 34 included in the operating table 14. The communication module 34 forwards the control signal to the control unit 32, which outputs the control signal to the driver unit 36. The driver unit 36 actuates one of the table components 38, 40, 42, and 44 based on the control signal.

In some embodiments, in order to assign the physical pushbutton units 22, 24, and 26 provided on the remote-control device 12 to the table components 38, 40, 42, and 44, the communication module 20 of the remote-control device 12 receives assignment information from the communication module 34 included in the operating table 14 and forwards the assignment information to the control unit 16. Based on the assignment information, the control unit 16 establishes a unique association between the pushbutton units 22, 24, and 26 and the table components 38, 40, 42, and 44. In some embodiments, the control unit 16 controls the display unit 18 to display a representation of the operating table 14 on the screen of the display unit 18 in such a manner that the user can visually recognize the assignments associating the physical pushbutton units 22, 24, and 26 with the table components 38, 40, 42, and 44. The assignments are explained in detail below with reference to FIGS. 2 and 5.

In the system 10 shown in FIG. 1, the communication module 20 of the remote-control device 12 forms a provisioning unit that receives, from the operating table 14, the assignment information. The control unit 16 defines a unique association between the pushbutton units 22, 24, and 26 and the table components 38, 40, 42, and 44 based on the assignment information. This type of provisioning of the assignment information is exemplary. In some embodiments, the above-mentioned provisioning unit is not formed by the communication module 20 of the remote-control device 12. For example, the provisioning unit may instead be implemented as an input pushbutton provided on the remote-control device 12, through which the user enters or changes the assignment information.

In FIGS. 2-5, different exemplary applications of the disclosed remote-control device are illustrated. Various embodiments of systems may include the remote-control device and the medical appliance shown in FIGS. 2-5.

Figure 2:
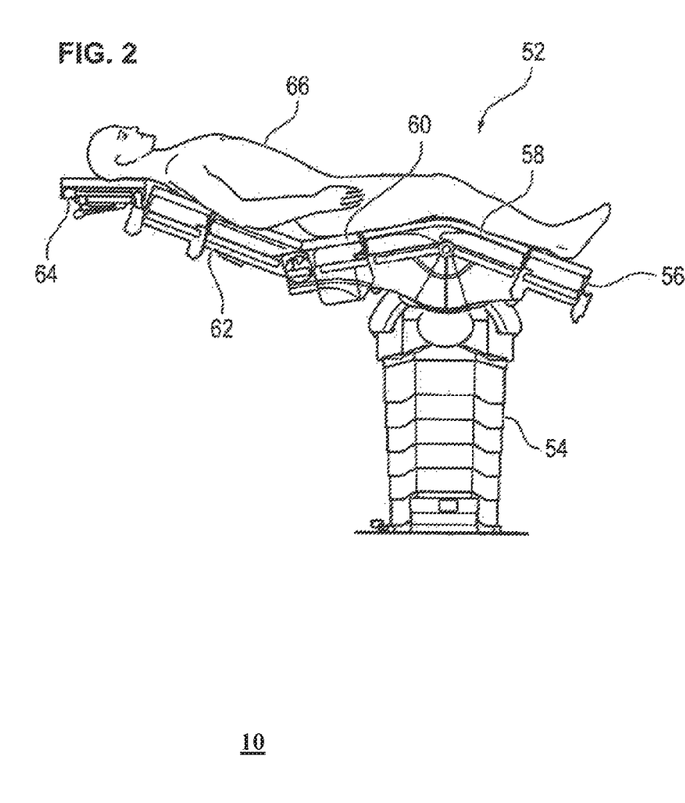
FIG. 2 shows a top view a remote-control device according to a first embodiment of the present disclosure and a perspective view of an operating table controllable by the remote-control device.

FIG. 2 shows a first embodiment of the system 10. In this embodiment, the system 10 includes a remote-control device 50, as a first embodiment of the remote-control device 12 shown in FIG. 1. Although not shown in FIG. 2, the remote-control device 50 includes the control unit 16, the display unit 18, and the communication unit 20 shown in FIG. 1. The system 10 also includes an operating table 52 that can be controlled by the remote-control device 50. The operating table 52 includes a table column 54, which can be adjusted via one or more actuators in the vertical and horizontal directions. A patient support surface 56 rests on the table column 54, which includes a lower leg segment 58, an upper leg segment 60, a back segment 62, and a head segment 64. The segments 58, 60, 62, and 64 are connected to one another by articulation, such that the patient support surface 56, on which the patient 66 lies, can be brought into a desired shape. The lower leg segment 58, the upper leg segment 60, and the back segment 62 can be adjusted through one or more actuators. The head segment 64, on the other hand, can be adjusted by hand in this configuration. In some embodiments, the head segment 64 can also be adjusted through one or more actuators.

As shown in FIG. 2, the remote-control device 50 includes a plurality of pushbutton units 68, 70, 72, and 74. The pushbutton units 68, 70, 72, and 74 are assigned (e.g., by the control unit 16 of the remote-control device 50) to different table components 54, 58, 60, and 62 based on the assignment information, which may be received from the operating table 52. For example, the pushbutton unit 68 may be assigned to the back segment 62. The pushbutton unit 68 includes two physical operating pushbuttons 68$u$ and 68$d$, through which the back segment 62 can be controlled to move upward or downward. In some embodiments, the pushbutton unit 68 may include any suitable number of physical operating pushbuttons, such as one, three, four, five, etc. The pushbutton unit 70 may be assigned to the upper leg segment 60. The pushbutton unit 70 includes two physical operating pushbuttons 70u and 70d. The pushbutton unit 70 may include any suitable number of physical operating pushbuttons, such as one, three, four, five, etc. Through the operating pushbutton 70u, the upper leg segment 60 can be controlled to move upward, and through the operating pushbutton 70d, the upper leg segment 60 can be controlled to move downward. The pushbutton unit 72 may be assigned to the lower leg segment 58. The pushbutton unit 72 includes two physical operating pushbuttons 72u and 72d, through which the lower leg segment 58 can be moved upward or downward. The pushbutton unit 72 may include any suitable number of physical operating pushbuttons, such as one, three, four, five, etc. The pushbutton unit 74 may be assigned to the table column 54 and includes four physical operating pushbuttons 74u, 74d, 74l, and 74r. The pushbutton unit 74 may include any suitable number of physical operating pushbuttons, such as one, three, five, six, etc. Through the operating pushbuttons 74u and 74d, the table column 54 can be controlled to move in the vertical direction upward or downward. Through the operating pushbuttons 74l and 74r, the table column 54 can be controlled to move in the horizontal direction toward the left or toward the right.

As shown in FIG. 2, the remote-control device 50 has three additional physical operating pushbuttons 76, 78, and 80. The operating pushbutton 76 may be figured to switch the remote-control device 50 on and off. Through the operating pushbuttons 78 and 80, additional table functions, such as tilting of the operating table 52, may be implemented. For example, the pushbutton 78 may be configured to tilt the operating table 52 to the left, and the pushbutton 80 may be configured to tilt the operating table 52 to the right. Other suitable number of additional physical operating pushbuttons may also be included in the remote-control device 50.

As shown in FIG. 2, the remote-control device 50 includes a screen 82 on which a representation of the operating table 52 is displayed diagrammatically. For the purpose of the diagrammatic representation, different pictograms 84, 86, 88, 90, 92, and 94 are displayed on the screen 82. The pictogram 84 represents the table column 54, the pictogram 86 represents the lower leg segment 58, the pictogram 88 represents the upper leg segment 60, the pictogram 90 represents the back segment 62, the pictogram 92 represents the head segment 64, and the pictogram 94 represents the patient 66.

The physical pushbutton units 68, 70, 72, and 74 are configured in such a manner that they each include an individual visually detectable distinguishing feature. As a result, it is possible for the user to visually distinguish the pushbutton units 68, 70, 72, and 74 from one another. In one embodiment, the visually detectable distinguishing feature is the color of the respective pushbutton unit. When the pushbutton units 68, 70, 72, and 74 have colors that are sufficiently distinguishable from one another, the user can visually distinguish the pushbutton units 68, 70, 72, and 74 from one another in a simple manner. Other visually detectable distinguishing features may also be used, such as different patterns, different crosshatchings, different shapes, or a combination thereof. For example, in some embodiments, different pushbutton units may have different colors and different patterns, different colors and different crosshatchings, or different patterns and different crosshatchings.

The unchangeable visually detectable distinguishing features of the physical pushbutton units 68, 70, 72, and 74 may be reproduced and displayed in the representation of the operating table 52 on the screen 82. For example, when the pushbutton units 68, 70, 72, and 74 are provided with different colors, these colors may be reproduced and displayed in the representation of the operating table 52 on the screen 82. For example, as shown in FIG. 2, the pictogram 90 displayed on the screen 82, which represents the back segment 62, has the same color (or other distinguishing feature) as the pushbutton unit 68 on the remote-control device 50, which is associated with the back segment 62 based on the assignment information. Likewise, the pictogram 88 displayed on the screen 82, which represents the upper leg segment 60, has the same color (or other distinguishing feature) as the pushbutton unit 70 on the remote-control device 50, which is associated with the upper leg segment 60 based on the assignment information. The pictogram 86 displayed on the screen 82, which represents the lower leg segment 58, has the same color (or other distinguishing feature) as the pushbutton unit 72 on the remote-control device 50, which is associated with the lower leg segment 58 based on the assignment information. The pictogram 84 displayed on the screen 82, which represents the table column 54, has the same color (or other distinguishing feature) as the pushbutton unit 74, which is associated with the table column 54 based on the assignment information.

In some embodiments, the table components 54, 58, 60, and 62 may be adjusted by one or more actuators that may be controlled by the remote-control device 50. The head segment 64 may be adjusted manually (i.e., not by an actuator). As shown in FIG. 2, the pictograms 84, 86, 88, and 90 representing the table components 54, 58, 60, and 62, respectively, are represented with solid lines on the screen 82. The pictogram 92 representing the head segment 64 is represented with a dashed contour line on the screen 82. As a result, the user can readily recognize that in the present configuration the head segment 64 cannot be adjusted via the remote-control device 50.

As shown in FIG. 2, the unchangeable pushbutton layout of the remote-control device 50 having physical pushbutton units 68, 70, 72, and 74 can be flexibly adapted based on the current configuration of the operating table 52. The adaptation is achieved by reproducing the unchangeable distinguishing features (e.g., colors) of the physical pushbutton units 68, 70, 72, and 74, in the representation of the operating table 52 on the screen 82. The reproduced distinguishing features may be in a changeable association with the pictograms 84, 86, 88, and 90 representing the adjustable table components 54, 58, 60, and 62. For example, in one configuration, the pictograms 84, 86, 88, and 90 may be associated with a first set of colors (e.g., red, blue, green, yellow, respectively) corresponding to a first combination of pushbuttons on the remote-control device 50. In another configuration, the pictograms 84, 86, 88, and 90 may be associated with a second set of colors (e.g., blue, yellow, green, red, respective) corresponding to a second combination of pushbuttons on the remote-control device 50.

Figure 3:
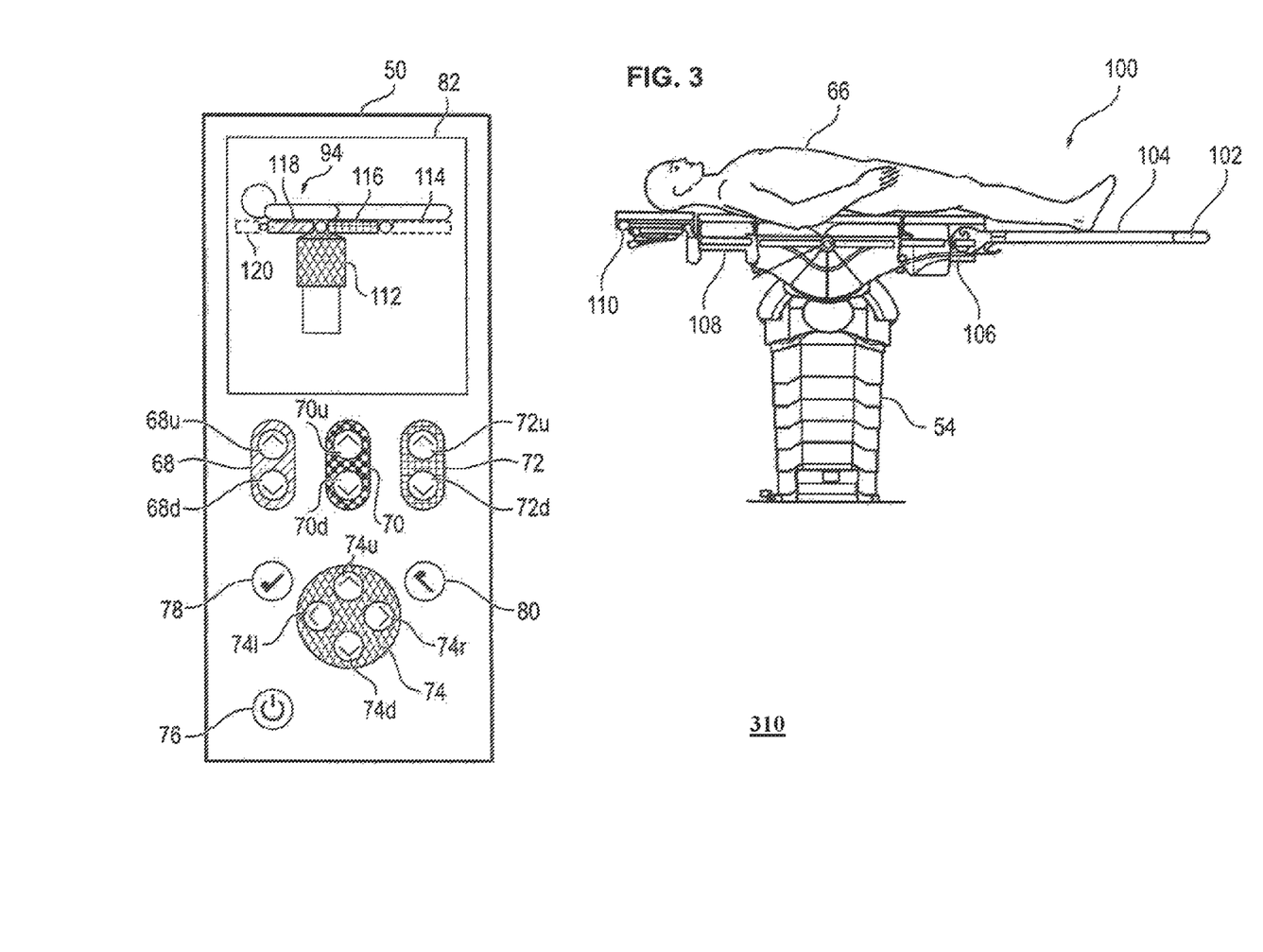
FIG. 3 shows the remote-control device of the first embodiment and the operating table controllable by the remote-control device in a configuration different from the configuration shown in FIG. 2.

The flexible adaptation of the remote-control device 50 to different table configurations is illustrated in FIG. 3, which shows a system 310 having the remote-control device 50 according to FIG. 2 together with a table configuration which deviates from the table configuration shown in FIG. 2.

The system 310 shown in FIG. 3 includes an operating table 100. The operating table 100 is of the same table model as the operating table 52 shown in FIG. 2, but differs from the operating table 52 in the configuration of a patient support surface 102. The patient support surface 102 includes a lower leg segment 104, an upper leg segment 106, a back segment 108, and a head segment 110. As in the configuration shown in FIG. 2, the upper leg segment 106 and the back segment 108 are adjustable by one or more actuators, while the head segment 110 is only manually adjustable. A difference between the configurations shown in FIGS. 2 and 3 is that in the configuration shown in FIG. 3, the lower leg segment 104 cannot be adjusted by actuators, but can only be adjusted manually.

The configuration shown in FIG. 3 is reflected in the representation of the operating table 100 on the screen 82 of the remote-control device 50. On the screen 82, a pictogram 112 displayed with a solid contour line represents the table column 54 that can be adjusted by one or more actuators. A pictogram 114 displayed with a dashed contour line represents the manually adjustable lower leg segment 104. A pictogram 116 displayed with a solid contour line represents the upper leg segment 106 that can be adjusted by one or more actuators. A pictogram 118 displayed with a solid contour line represents the back segment 108 that can be adjusted by one or more actuators. A pictogram 120 displayed with a dashed contour line represents the head segment 110 that can only be adjusted manually.

Based on the assignment information that the operating table 102 sends to the remote-control device 50, the pushbutton unit 68 is assigned (e.g., via the control unit 16 of the remote-control device 50) to the back segment 108, the pushbutton unit 72 is assigned to the upper leg segment 106, and the pushbutton unit 74 is assigned to the table column 54. In this configuration, the pushbutton unit 70 is deactivated, i.e., it does not control any table component.

In the configuration shown in FIG. 3, the pictogram 112 displayed on the screen 82 has the same color as that of the pushbutton unit 74. The pictogram 116 displayed on the screen 82 has the color as that of the pushbutton unit 72. The pictogram 118 displayed on the screen 82 has the same color as that of the pushbutton unit 68. A user can readily recognize that the pushbutton unit 74 controls the table column 54 represented by the pictogram 112, the pushbutton 72 controls the upper leg segment 106 represented by the pictogram 116, and the pushbutton unit 68 controls the back segment 108 represented by the pictogram 118.

Figure 4:
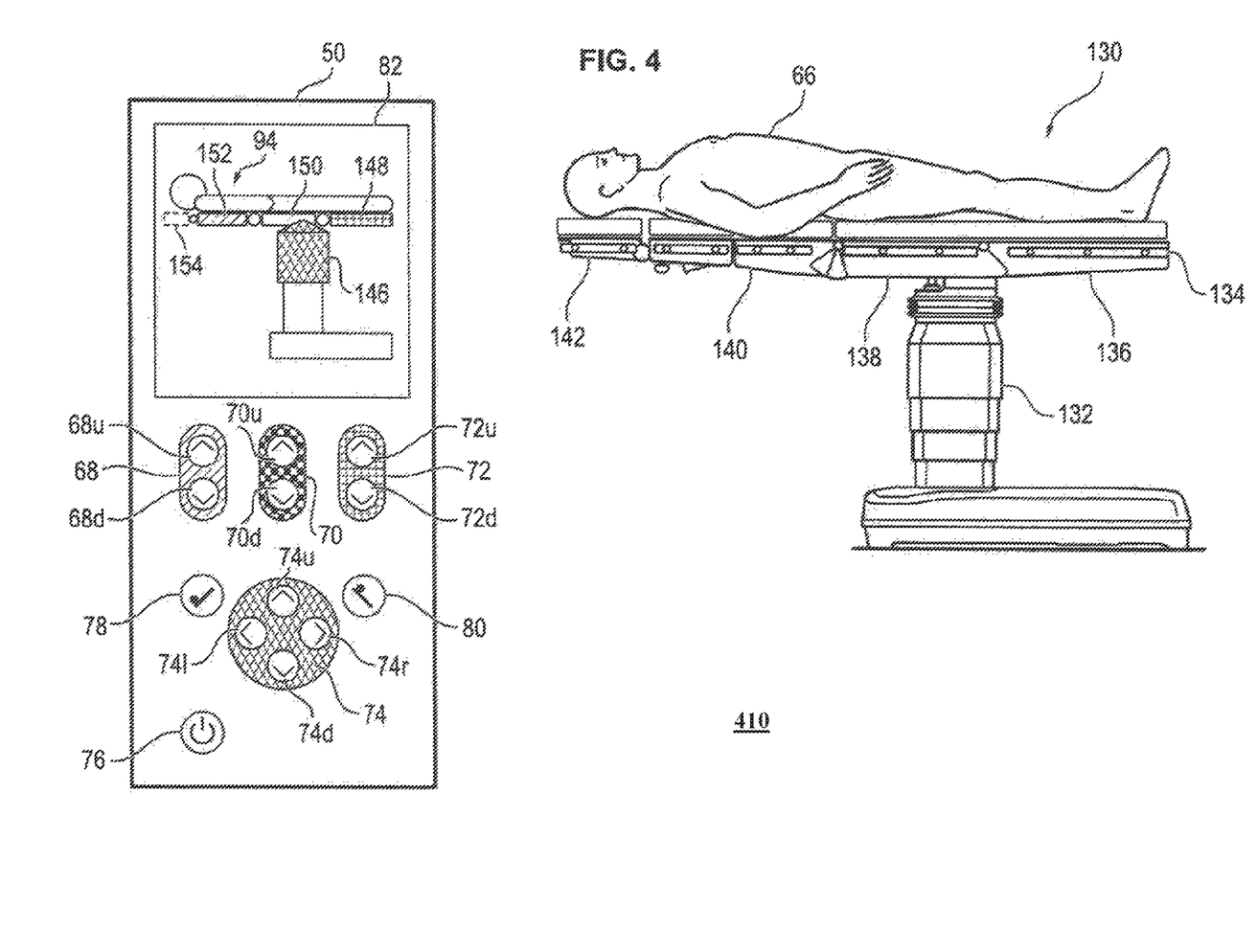
FIG. 4 shows the remote-control device of the first embodiment and a perspective view of another operating table, different from the operating table shown in FIGS. 2 and 3, controllable by the remote-control device.

FIG. 4 shows an additional exemplary application of the remote-control device 50, in which the remote-control device 50 is used for actuating a table model different from the table models shown in FIGS. 2 and 3.

FIG. 4 shows a system 410 having an operating table 130 with a table column 132 that can be adjusted by one or more actuators both vertically and horizontally, on which a patient support surface 134 rests. The patient support surface 134 includes a lower leg segment 136, an upper leg segment 138, a back segment 140, and a head segment 142. The lower leg segment 136 and the back segment 140 can be adjusted via one or more actuators. The head segment 142 is manually adjustable. In this model, the upper leg segment 138 is not adjustable.

Based on the assignment information that the operating table 130 sends to the remote-control device 50, the pushbutton unit 68 is assigned (e.g., by the control unit 16 of the remote-control device 50) to the back segment 140. The pushbutton unit 72 is assigned to the lower leg segment 136, and the pushbutton unit 74 is assigned to the table column 132. The pushbutton unit 70 is deactivated.

As shown in FIG. 4, the screen 82 displays a representation of the operating table 130. The representation of the operating table 130 includes a pictogram 146 representing the table column 132, a pictogram 148 representing the lower leg segment 136, a pictogram 150 representing the upper leg segment 138, a pictogram 152 representing the back segment 140, and a pictogram 154 representing the head segment 142. The pictograms 146, 148, and 152 representing the table components 132, 136, and 140, respectively, which can be adjusted by one or more actuators, are displayed with solid contour lines. The pictogram 154 representing the head segment 142 that can be adjusted manually is displayed with a dashed contour line.

In accordance with the assignment information received by the remote-control device 50, the pictogram 146 displayed on the screen 82 has the same color as that of the pushbutton unit 74, the pictogram 148 has the same color as that of the pushbutton unit 72, and the pictogram 152 has the same color as that of the pushbutton unit 68.

Figure 5:
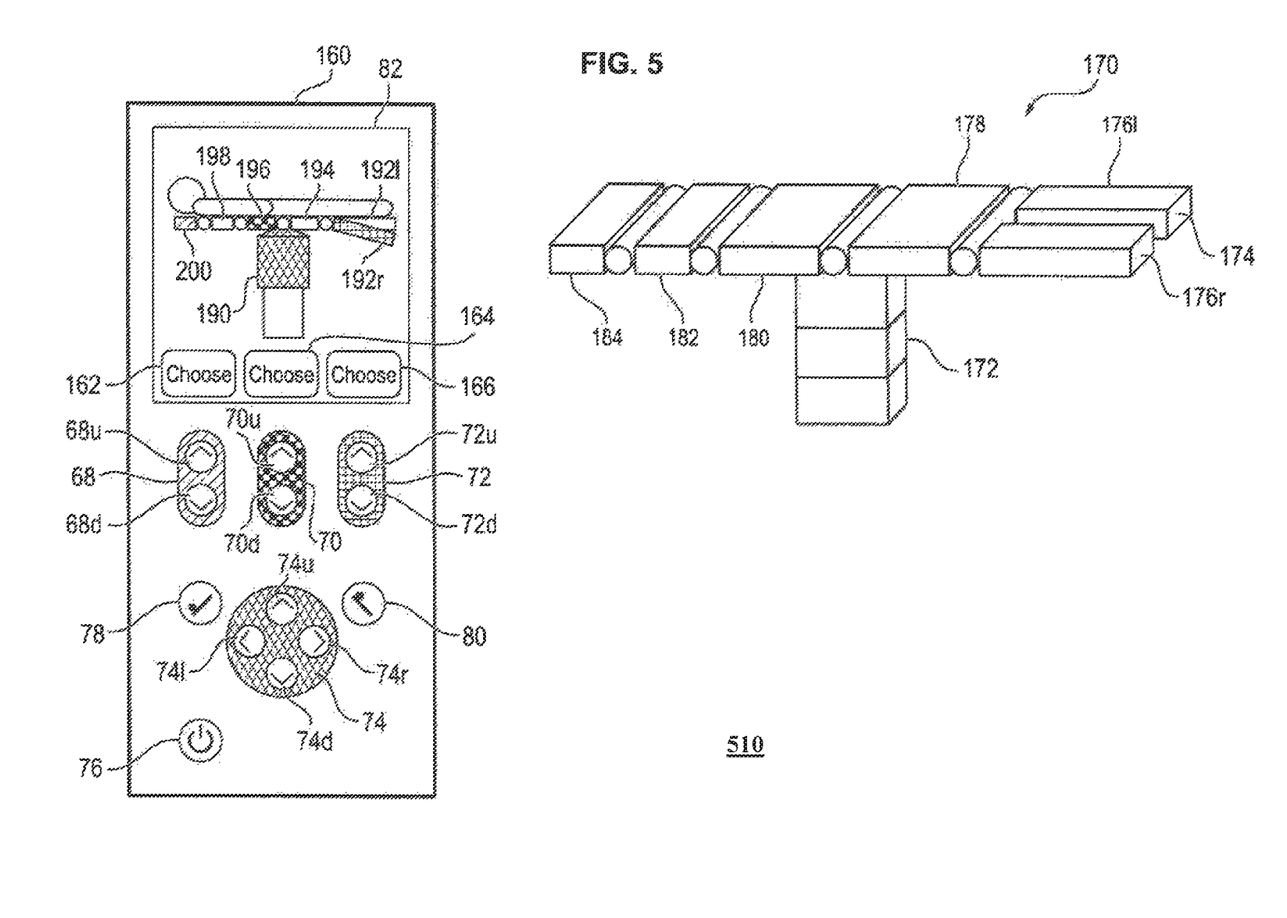
FIG. 5 is a top view of a second embodiment of a remote-control device according to the present disclosure and a perspective view of an operating table controllable by the remote-control device.

FIG. 5 shows yet another exemplary application of the remote-control device. FIG. 5 shows a system 510 having a remote-control device 160 that differs from the remote-control device 50 shown in FIGS. 2 to 4 in that the remote-control device 160 includes three additional selection pushbuttons 162, 164, and 166. In some embodiments, other suitable number of additional selection pushbuttons may be included. The selection pushbuttons 162, 164, and 166 are embodiments of the input pushbuttons of the provisioning unit described above for receiving an input relating to the assignment information (e.g., change of the assignment). In some embodiments, the selection pushbuttons 162, 164, and 166 may be displayed on the touch-sensitive screen 82, or may be switching surfaces arranged on the touch-sensitive screen 82. In some embodiments, the selection pushbuttons 162, 164, and 166 are virtual operating pushbuttons that are displayed on the touch-sensitive screen 82. Except for the additional selection pushbuttons 162, 164, and 166, the remote-control device 160 is otherwise substantially identical to the remote-control device 50 shown in FIGS. 2 to 4.

In the example shown in FIG. 5, the system 510 includes an operating table 170, the structure of which tray be more complex than that of the operating tables shown in FIGS. 2 to 4. The operating table 170 includes a table column 172 that can be adjusted by one or more actuators both vertically and horizontally. The operating table 170 also includes a patient support surface 174. The patient support surface 174 is formed by two lower leg segments **176*l*, 176*r* that can be adjusted independently of one another, an upper leg segment 178, a lower back segment 180, an upper back segment 182, and a head segment 184. The table segments 176*r*, 176*l*, 178, 180, 182, and 184 can be adjusted individually by one or more actuators. Thus, in some embodiments, the operating table 174** has seven table segments that can be controlled individually by one or more actuators.

Comparing the remote-control device 160 to the operating table 174, the remote-control device 160 has only four physical pushbutton units 68, 70, 72, and 74. In order to control all seven table components 172, **176*l*, 176*r*, 178, 180, 182, and 184 of the operating table 170 using the four physical pushbutton units 68, 70, 72, and 74 of the remote-control device 160, the remote-control device 160 includes the three virtual selection pushbuttons 162, 164, and 166 displayed on the touch-sensitive screen 82**.

In the embodiment shown in FIG. 5, the remote-control device 160 receives first assignment information from the operating table 170 and receives second, refining assignment information through the selection pushbuttons 162, 164, and 166. Based on the first assignment information, the pushbutton unit 74 is assigned (e.g., by the control unit 16 included in the remote-control device 160) to the table column 172. Furthermore, based on the first assignment information, with regard to the pushbutton units 68, 70, and 72, an initial assignment is established, such that one of two possible table components is assigned to each of these pushbutton units 68, 70, and 72. For example, either the upper back segment 182 or the head segment 184 may be initially assigned to the pushbutton unit 68. Either the upper leg segment 178 or the lower back segment 180 may be initially assigned to the pushbutton unit 70. Either the lower leg segment 176l or the lower leg segment 176r may be initially assigned to the pushbutton unit 72.

The initial assignment can be changed through an input (i.e., the second, refining assignment information) received at one or more of the selection pushbuttons 162, 164, and 166. In some embodiments, the selection pushbutton 162 may be used for changing the assignment for the pushbutton unit 68, the selection pushbutton 164 may be used for changing the assignment for the pushbutton unit 70, and the selection pushbutton 166 may be used for changing the assignment for the pushbutton unit 72.

As shown in FIG. 5, the screen 82 displays a representation of the operating table 170. The representation includes a pictogram 190 representing the table column 172, a pictogram 192l representing the lower leg segment 176l, a pictogram 192r representing the lower leg segment 176r, a pictogram 194 representing the upper leg segment 178, a pictogram 196 representing the lower back segment 180, a pictogram 198 representing the upper back segment 182, and a pictogram 200 representing the head segment 184.

According to the assignments, as shown in FIG. 5, the pictogram 190 representing the table column 172 has the same color as that of the pushbutton unit 74. The pictogram 192r representing the lower leg segment 176r has the same color as that of the pushbutton unit 72. The pictogram 196 representing the lower back plate 180 has the same color as that of the pushbutton unit 70. In the assignment shown in FIG. 5, the pictogram 200 representing the head plate 184 has the same color as that of the pushbutton unit 68.

As explained above, with the aid of the selection pushbuttons 162, 164, and 166, the assignments with respect to the pushbutton units 68, 70, and 72 can be changed. For example, when the user presses the selection pushbutton 162, the assignment of the pushbutton unit 68 to the head segment 184 may be cancelled and, instead, the pushbutton unit 68 may be assigned to the upper back segment 182. In other words, when the selection pushbutton 162 is selected (e.g., an input is received at the selection pushbutton 162), the head segment 184 is deselected and the upper back segment 182 is instead selected such that the assignment of the pushbutton unit 68 is changed from the head segment 184 to the upper back segment 182. On the screen 82, the change in the assignment is reflected by switching displaying the color of the pushbutton unit 68 at the pictogram 200 to displaying the color of the pushbutton unit 68 at the pictogram 198. Likewise, a corresponding color change occurs between the pictograms 196 and 194 when the user actuates the selection pushbutton 164. A corresponding color change occurs between the pictograms 192r and 192l when the user actuates the selection pushbutton 166.

In the above embodiments, the operating pushbuttons 68u and 68d of the pushbutton unit 68, the operating pushbuttons 70u and 70d of the pushbutton unit 70, the operating pushbuttons 72u and 72d of the pushbutton unit 72, and the operating pushbuttons 74u, 74d, 74l, and 74r of the pushbutton unit 74 each have an arrow symbol that indicates the function of the respective operating pushbutton. The arrow symbol is an example of visual indicators associated with the physical pushbutton units for indicating functions of the pushbutton units. In the example shown in FIG. 5, the upward pointing arrow symbol provided on the operating pushbutton 74u of the pushbutton unit 74 indicates that the function of the operating pushbutton 74u is to move the table component associated therewith upward. The arrow symbols provided on the operating pushbuttons 74l, 74r, and 74d indicate that the functions of these operating pushbuttons are to move the table components associated therewith to the left, to the right, or downward, respectively. The same applies to the arrow symbols of the pushbutton units 68, 70, and 72.

These visual indicators (e.g., arrow symbols) are independent of the respective visually detectable distinguishing features, for example, the colors, the crosshatchings, etc., of the pushbutton unit 68, 70, 72, and 74. In the representation displayed on the screen 82, the individual visually detectable distinguishing features of the pushbutton units 68, 70, 72, and 74, e.g., the colors, crosshatchings thereof, etc., are used to indicate to the user the assignments of the respective pushbutton units to the associated table components. In some embodiments, the visual indicators for indicating the pushbutton functions, e.g., the arrow symbols, are not displayed on the screen 82, as shown in FIGS. 3 to 5. In some embodiments, arrow symbols (which may or may not have the same appearance as the arrow symbols provided on the physical pushbutton units) may also be displayed on the screen 82 to indicate the movement direction of the table component that is being controlled by a corresponding pushbutton unit. For example, when the operating pushbutton 74u is used to control the upward movement of the lower leg segment 176r, an upward arrow may be displayed on the screen 82 to indicate the upward movement direction of the pictogram 192r.

Figure 6:
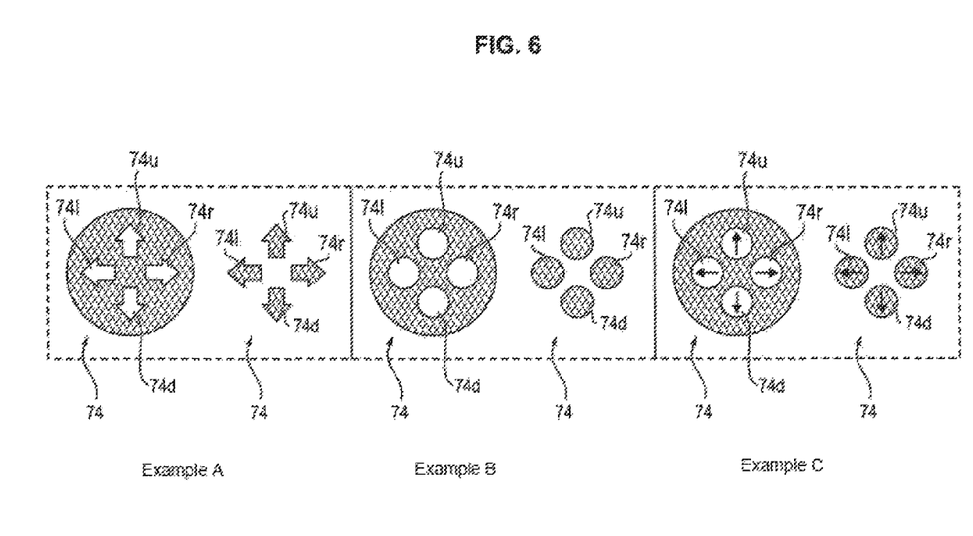
FIG. 6 shows three exemplary implementations of individual visually detectable distinguishing features for pushbuttons on a remote-control device in accordance with the present teachings.

In some embodiments, other visual indicators may be used to indicate the pushbutton functions. Examples of the other visual indicators are illustrated for the pushbutton unit 74 in FIG. 6. These visual indicators can also be used to indicate functions of other pushbutton units, such as 68, 70, and 72. FIG. 6 shows three exemplary visual indicators, Example A, Example B, and Example C. In Example A, thick arrows are used. In Example B, circles are used. In Example C, circles with arrows inside are used. In each example, the respective crosshatching pattern represents the individual visually detectable distinguishing feature that is reproduced and displayed on the screen 82 in the associated pictogram to represent the assignment relation between the pushbutton unit and the table component to be actuated or controlled by the pushbutton unit. In the examples shown in FIG. 6, the shapes of the operating pushbuttons (e.g., the thick arrow shapes in Example A), the arrangement of the operating pushbuttons with respect to one another (e.g., the arrangement of the circles in Example B), and the arrow symbols (e.g., the arrow symbols in Example C) provided on the operating pushbuttons represent the respective pushbutton functions. These visual indicators do not have to be reproduced and displayed on the screen 82, although they may also be reproduced and displayed on the screen 82 if desired.

Figure 7:
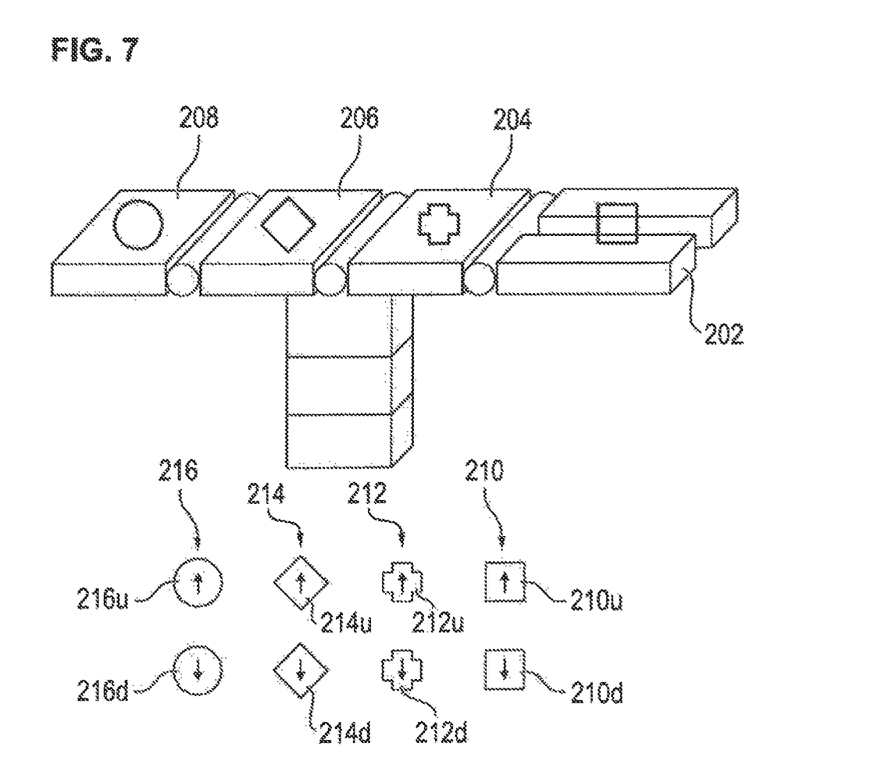
FIG. 7 shows additional exemplary implementations of the individual visually detectable distinguishing features for a remote-control device configured to control an operating table, in association with a representation of the operating table to be controlled displayed on a screen of the remote-control device.

The individual visually detectable distinguishing features of the pushbutton units that are reproduced and displayed on the screen 82 in the associated pictograms are not limited to different colors, patterns, or crosshatchings. For example, the shapes of the operating pushbuttons arranged in the pushbutton units may be used as distinguishing features and may be reproduced and displayed on the screen 82. An example is illustrated in FIG. 7. FIG. 7 shows a representation of an operating table on the screen 82. FIG. 7 also shows physical pushbutton units 210, 212, 214, and 216 provided on a remote-control device disclosed herein. The operating table includes a plurality of table components represented by pictograms 202, 204, 206, 208. Physical pushbutton units 210, 212, 214, and 216 each include a pair of two opposite operating pushbuttons. Pushbutton unit 210 includes two operating pushbuttons 210$u$, 210$d$. Pushbutton unit 212 includes two operating pushbuttons 212$u$, 212$d$. Pushbutton unit 214 includes two operating pushbuttons 214$u$, 214$d$. Pushbutton unit 216 includes two operating pushbuttons 216$u$, 216$d$. As shown in FIG. 7, the operating pushbuttons of the pushbutton units 210, 212, 214, and 216 have different shapes as individual distinguishing features. The pushbuttons of the pushbutton unit 210 have a square shape, the pushbuttons of the pushbutton unit 212 have a cross shape, the pushbuttons of the pushbutton unit 214 have a diamond shape, and the pushbuttons of the pushbutton unit 216 have a circle shape. The shapes of the pushbutton units 210, 212, 214, and 216 can be reproduced and displayed in the representation of the operating table on the screen 82 to indicate the assignments of the pushbutton units 210, 212, 214, and 216 to the actuatable table components represented by the pictograms 202, 204, 206 and 208, respectively. As shown in FIG. 7, the circle shape of the pushbutton unit 216 is displayed at the pictogram 208 to indicate that the pushbutton unit 216 is assigned to the table component represented by the pictogram 208. The diamond shape of the pushbutton unit 214 is displayed at the pictogram 206 to indicate that the pushbutton unit 206 is assigned to the table component represented by the pictogram 206. The cross shape of the pushbutton unit 212 is displayed at the pictogram 204 to indicate that the pushbutton unit 212 is assigned to the table component represented by the pictogram 204. The square shape of the pushbutton unit 210 is displayed at the pictogram 202 to indicate that the pushbutton unit 210 is assigned to the table component represented by the pictogram 202.

Figure 8:
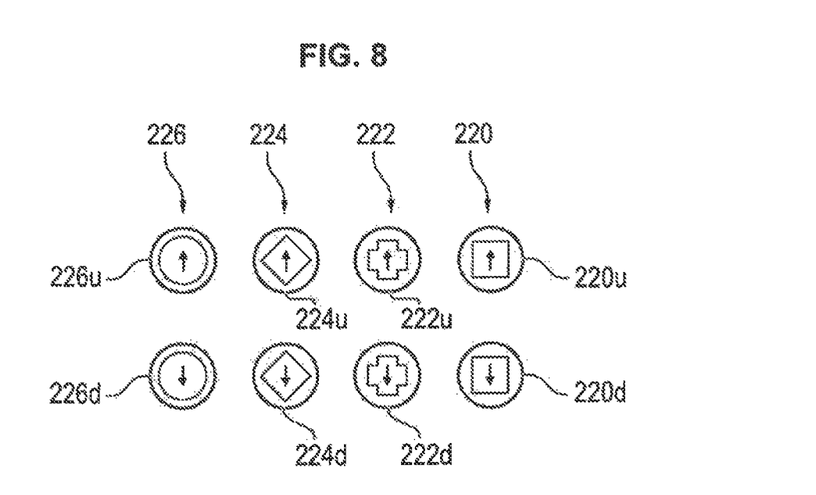
FIG. 8 shows additional exemplary implementations of the individual visually detectable distinguishing features of a remote-control device in accordance with the present teachings.

FIG. 8 shows an additional example of the individual distinguishing features of the pushbutton units that can be reproduced and displayed on the screen 82. In this example, four pushbutton units 220, 222, 224, and 226 are provided on the remote-control device. Each of the pushbutton units includes two operating pushbuttons. The pushbutton unit 220 includes two operating pushbuttons 220$u$, 220$d$. The pushbutton unit 222 includes two operating pushbuttons 222$u$, 222$d$. The pushbutton unit 224 includes two operating pushbuttons 224$u$, 224$d$. The pushbutton unit 226 includes two operating pushbuttons 226$u$, 226$d$. All the operating pushbuttons of the pushbutton units 220, 222, 224 and 226 have a round shape, as indicated by a circle enclosing a shape that is the same as the shape of pushbutton units 210, 212, 214, and 216, respectively. The operating pushbuttons of the different pushbutton units 220, 222, 224 and 226 differ by different symbols inside the circle, which can be used as individual distinguishing features that can be reproduced and displayed in the representation on the screen 82, similar to the embodiment shown in FIG. 7.

The invention claimed is:

1. A remote-control device for controlling an operating table having a plurality of moveable table components, comprising:
a plurality of physical pushbuttons each assigned to control one of the plurality of moveable table components to move in at least one direction, each of the pushbuttons being provided with a visually detectable distinguishing feature for visually distinguishing pushbuttons;
a display unit configured to display a representation of the operating table comprising a plurality of pictograms, each pictogram representing one of the moveable table components; and
a provisioning unit configured to receive assignment information defining a unique association between a pushbutton and a moveable table component to be controlled by the respective pushbutton;
wherein said each pictogram has the same visually detectable distinguishing feature as a corresponding pushbutton to which the one of the movable table components is assigned,
wherein the provisioning unit includes a selection pushbutton configured to receive an input for changing an assignment of a pushbutton from a first moveable table component to a second moveable table component.

2. The remote-control device of claim 1, wherein a position of each of the pushbuttons is in vertical alignment with the pictogram of the moveable table component on the display unit to which the respective pushbutton is assigned.

3. The remote-control device of claim 1,
wherein the visually detectable distinguishing feature comprises color, and
wherein the display unit is configured to simultaneously display said plurality of pictograms representing movable table parts using a plurality of different respective colors.

4. The remote-control device of claim 1, wherein the visually detectable distinguishing feature is formed by at least one of color, pattern, and crosshatching.

5. The remote-control device of claim 1, wherein each of the pushbuttons includes one or more visual indicators for indicating pushbutton functions, the visual indicators being independent of the visually detectable distinguishing feature associated with the corresponding pushbutton to which the moveable table component is assigned.

6. The remote-control device of claim 1, wherein the display unit is configured to display pictograms representing non-actuatable table components that are not controllable by the pushbutton units, and the pictograms representing moveable components that are controllable by the pushbutton units,
wherein the pictograms are presented in a manner that visually differentiates the pictograms of non-actuatable table components from the pictograms of the moveable table components.

7. The remote-control device of claim 1, wherein the plurality of pushbuttons comprises at least one first pushbutton configured to control a first moveable table component of the plurality of moveable table components, and at least one second pushbutton configured to control a second moveable table component of the plurality of moveable table components.

8. The remote-control device of claim 7:
wherein the at least one first pushbutton and the at least one second pushbutton are positioned laterally of each other;
wherein the at least one first pushbutton is vertically aligned with a pictogram representing the first moveable table component displayed on the display unit; and
wherein the at least one second pushbutton is vertically aligned with a pictogram representing the second moveable table component displayed on the display unit.

9. The remote-control device of claim 1:
   wherein the plurality of pushbuttons comprises:
      two pushbuttons configured to respectively raise and lower a first movable table component, both having a first visually detectable distinguishing feature corresponding to the first movable table component; and
      two pushbuttons configured to respectively raise and lower a second movable table component, both having a second visually detectable distinguishing feature corresponding to the second movable table component.

10. A remote-control device for controlling an operating table having a plurality of moveable table components, the remote-control device comprising:
   a plurality of physical pushbuttons each assigned to control one of the plurality of movable table components to move in at least one direction such that the plurality of pushbuttons can collectively move a plurality of different moveable table components, each of the pushbuttons being provided with a visually detectable distinguishing feature for visually distinguishing between pushbuttons; and
   a display unit configured to display a representation of the operating table, the representation comprising a plurality of pictograms each representing one of the moveable table components,
   wherein each pictogram representing one of the table components has the same visually detectable distinguishing feature as a corresponding pushbutton to which the moveable table component is assigned, the visually detectable distinguishing feature including at least one of a color, a pattern, or crosshatching; and
   wherein the remote-control device is configured so that the display will simultaneously display pictograms having different respective visually detectable distinguishing features at the same time, corresponding to different respective corresponding pushbuttons.

11. The remote-control device of claim 10, wherein the remote-control device further includes:
   a provisioning unit configured to receive assignment information defining a unique association between a pushbutton and a moveable table component to be controlled by the respective pushbutton.

12. The remote-control device of claim 11, wherein the remote-control device further includes:
   a control unit configured to assign a pushbutton to a moveable table component based on the assignment information.

13. The remote-control device of claim 10, wherein the visually detectable distinguishing feature is formed by at least one of color, pattern, and crosshatching.

14. The remote-control device of claim 10, wherein the plurality of moveable table components to be controlled include at least two of an operating table column, a head segment of the operating table, a back segment of the operating table, and a leg segment of the operating table.

15. The remote control device of claim 11, wherein the visually detectable distinguishing feature comprises color; and
   wherein the remote-control device is configured so that the display will simultaneously display pictograms having different respective colors at the same time, corresponding to different respective corresponding pushbuttons.

16. The remote-control device of claim 10, wherein a position of each of the pushbuttons is in alignment with the pictogram of the moveable table component on the display unit to which the respective pushbutton is assigned.

17. The remote-control device of claim 10, wherein the plurality of pushbuttons comprises at least one first pushbutton configured to control a first moveable table component of the plurality of moveable table components, and at least one second pushbutton configured to control a second moveable table component of the plurality of moveable table components.

18. The remote-control device of claim 10, wherein one or more of the plurality of pushbuttons at least one of raises or lowers at least one of the plurality of moveable table components to provide movement to at least one of the plurality of moveable table components; and
   said movement is displayed on the display unit by corresponding movement of a corresponding pictogram.

19. The remote-control device of claim 10:
   further comprising a selection pushbutton configured to receive input for changing an assignment of a first pushbutton from a first moveable table component to a second moveable table component;
   wherein the first pushbutton has a first visually detectable distinguishing feature comprising at least one color, pattern, or crosshatching;
   wherein when the first pushbutton is reassigned from the first movable component to the second movable table component, the display removes the first visually detectable distinguishing features from a pictogram representing the first movable component, and adds the first visually detectable distinguishing feature to a pictogram representing the second movable component.

20. The remote-control device of claim 10:
   wherein the plurality of pushbuttons comprises:
      two pushbuttons configured to respectively raise and lower a first movable table component, both having a first visually detectable distinguishing feature corresponding to the first movable table component; and
      two pushbuttons configured to respectively raise and lower a second movable table component, both having a second visually detectable distinguishing feature corresponding to the second movable table component.

21. A system, comprising:
   an operating table including a plurality of moveable table components; and
   a remote-control device comprising:
   a plurality of physical pushbuttons each assigned to control one of the plurality of movable table components to move in at least one direction such that the plurality of pushbuttons can collectively move a plurality of different moveable table components, each of the pushbuttons being provided with a visually detectable distinguishing feature for visually distinguishing between pushbuttons;
   a display unit configured to display a representation of the operating table, the representation comprising a plurality of pictograms each representing one of the moveable table components; and
   a provisioning unit configured to receive assignment information defining a unique association between a pushbutton and a moveable table component to be controlled by the respective pushbutton,
   wherein each pictogram representing one of the moveable table components has the same visually detectable distinguishing feature as a corresponding pushbutton to which the one of the moveable table components is assigned, wherein the provisioning unit includes a selection pushbutton configured to receive an input for changing an assignment of a pushbutton from a first-moveable table component to a second-moveable table component.

22. A method for controlling an operating table having a plurality of appliance components using a remote-control device having a display unit and a plurality of pushbutton units each including at least one physical operating pushbutton, the method comprising:

receiving, at a provisioning unit of the remote-control device, assignment information from the operating table;

assigning control of a first appliance component to a first pushbutton unit on a the remote-control device and control of a second appliance component to a second pushbutton unit on the remote-control device based on the assignment information, wherein each of the first and second pushbutton units has a unique, visually detectable distinguishing feature comprising at least one of a color, a pattern, and crosshatching; and simultaneously displaying, on the display unit of the remote-control device, a pictogram representing the first appliance component and a pictogram representing the second appliance component, wherein the pictograms displayed on the display unit are provided with the same unique, visually detectable distinguishing feature as the corresponding pushbutton unit to which the corresponding appliance component is assigned based on the assignment information, wherein said displaying includes simultaneously displaying pictograms having different respective visually detectable distinguishing features at the same time; and wherein the first appliance component is one of an operating table column, a head segment of the operating table, a back segment of the operating table, and a leg segment of the operating table, and the second appliance is another of the operating table column, the head segment of the operating table, the back segment of the operating table, and the leg segment of the operating table.

23. The method of claim 22, further comprising:

receiving an input that changes an assignment of the first pushbutton unit from the first appliance component to a third appliance component.

* * * * *